United States Patent Office 2,941,006
Patented June 14, 1960

2,941,006

PRODUCTION OF POLYHYDROXY ALDEHYDES FROM VIC-EPOXY ALDEHYDES

Charles R. Greene, Berkeley, Calif., assignor to Shell Oil Company, a corporation of Delaware No Drawing. Filed Dec. 23, 1957, Ser. No. 704,352

11 Claims. (Cl. 260—602)

This invention relates to the hydration of oxirane compounds to produce polyhydroxy compounds. It deals with a new and more advantageous method for carrying out such reactions which is especially adapted for large scale commercial operation.

It is known that polyhydroxy compounds can be produced by reacting the corresponding oxirane compounds with water. The rate of reaction is relatively slow, however, unless the process is carried out in the vapor phase. This is not a practical solution to the problem of slow reaction rates except in the case of the simple, most stable oxirane compounds because of the undesirable tendency of other oxirane compounds toward by-product formation under such conditions. Catalysts for liquid phase reaction, especially acid catalysts, have been used but even the most successful of these still result in hydration rates which are much slower than would be desirable and also may promote undesirable side reactions.

An important object of the present invention is the provision of an improved method for hydrating oxirane compounds which avoids the foregoing disadvantages of the procedures of the prior art. A more specific object is to provide an efficient method for the rapid hydration of oxirane compounds in the liquid phase with minimized by-product formation. Another object is the production of polyhydroxy compounds from the corresponding oxirane compounds in an efficient and economical manner using cheap equipment of large capacity so as to reduce the cost of the final product. A special object is the hydration of substituted oxirane compounds which are prone to undesirable side reactions during such conversion using for the hydration a process which affords rapid reaction without substantial by-product formation. Other objects and advantages of the invention will be apparent from the following description of the new process.

In accordance with the invention polyhydroxy compounds are produced by hydrating the corresponding oxirane compounds in an aqueous medium by adding acid thereto in an amount sufficient to reduce the pH to not more than about 5 but an amount not greater than about 0.4 equivalents of acid per mole of oxirane oxygen used and contacting the mixture at elevated temperature with a porous, solid catalyst. By this method of operation the amount of added acid required to obtain the desired short reaction times of not more than about 30 minutes, and more advantageously not more than about 10 minutes, is reduced to a quantity so small that reactions by the anion of the added acid are substantially eliminated and high yields of polyhydroxy compound are obtained. This is quite unexpected since the acceleration in hydration rate by use of the acidic solid catalysts is far more than would be predicted on the basis of their contribution to the hydrogen ion concentration of the reaction mixture. There appears to be a synergistic action between the acidic solid catalyst and added soluble acid catalyst in the new process of the invention. This results in an enormous increase in the rate of hydration at the solid surface. Oxirane hydrations that require residence times of the order of 3 to 8 hours when using conventional methods are accomplished in a few minutes when using the synergistic combination of catalysts according to the invention. This is illustrated by the results of the following tests made on the hydration of glycidaldehyde, employed as a 14% weight solution in water, using sulfuric acid as the added acid and "Celite VIII" as the porous solid catalyst. In all cases the hydrations were carried out at 80° to 85° C.

Using sulfuric acid alone, 0.02 to 0.03 mole per mole of glycidaldehyde to bring the pH of the reaction mixture to 1, three hours were required for 95% conversion of the glycidaldehyde and the yield of glyceraldehyde was 85%.

With "Celite VIII" as the only catalyst employed as a 295 cc. bed with effluent of pH 2.5, two and one-half hours were required for 95% conversion of glycidaldehyde and the yield of glyceraldehyde was 70% of the theoretical.

When the same "Celite VIII" bed was used with sulfuric acid added to the feed to bring the pH to 1, only 6 to 7 minutes was required for 95% conversion of the glycidaldehyde and the yield of glyceraldehyde was essentially quantitative. The combination of the solid acidic surface catalyst and dissolved added catalyst affords a hydration rate of oxirane compounds so high that competitive side reactions cannot occur to any substantial extent before production of the desired polyhydroxy product is complete.

The most effective solid catalysts for use in the new process are those having both a relatively high surface area and a high porosity. The surface area and porosity of the catalysts are usually related, those of highest surface area having the smallest pore sizes. Catalysts having a surface area between about 500 and about 800 square meters per gram and average pore diameters between about 20 and about 50 Angstrom units have been found to be particularly useful. Those with lower surface areas between about 100 and 500 square meters per gram having an average pore diameter between about 50 and about 100 A. or higher, although generally less active in the process, are still useful catalysts. Especially advantageous are porous catalysts having a pronounced acidity as measured, for example, by titration with an organic base, a small amount of $Al_2O_3$ deposited on silica gel has been found to have acid characteristics similar to an inorganic acid, and catalysts of this type are particularly useful in the process of the invention. These catalysts containing between 0.1% and about 25% and more preferably between about 10% and about 15% by weight of alumina based on the silica gel are particularly useful. Those containing about 12.5% silica are most stable in aqueous media. These catalysts can be prepared, for example, by depositing the required amount of alumina in the form of an aqueous solution of aluminum nitrate or other suitable salt, on silica gel, followed by heating at between about 400° to about 700° C. for about 2 to about 48 hours using the shorter times at the higher temperatures and vice versa. Silica-alumina cracking catalysts, for instance prepared as described in Ashley et al., U.S. Patent No. 2,411,820, are also advantageous particularly when made with up to about 13% $Al_2O_3$ and calcined as indicated above.

Instead of porous solids of the foregoing acidic type one can successfully use non-acidic solid adsorbent inorganic contact materials as catalysts. Apparently a portion of the acid added with the epoxyaldehyde feed is absorbed on the porous contact material during its use in the reaction so the contact material functions as an acidic solid catalyst in the process of the invention. Among the suitable porous inorganic contact materials of this kind which have been found to be effective, the absorbent siliceous materials are especially advantageous. These include, for instance, silica catalysts such as the bonded silica in pellet form sold by Johns-Manville under the trade mark "Celite VIII" or silica gel in granular form such as is marketed by Davison Chemical Company and others, or the like. Other examples are the activated clays such as burnt Attapulgus clay, acid activated Montmorillonite type clays, and the like.

When employing non-acidic adsorbent inorganic contact material in the process it can advantageously be predicated to deposit acid thereon. In this way one avoids the induction period which may otherwise be encountered before the desired high hydration rate is achieved in the process. Preferably the same acid is used as that which is added with the epoxyaldehyde feed to the hydration. Strong inorganic acids are most desirable in both cases. Preferably a polyvalent, non-oxidizing acid is employed. Typical examples of suitable acids are, for instance, sulfuric, phosphoric, and phospho-tungstic acids and the like. Catalysts comprising largely silica having deposited thereon a monomolecular layer of strong inorganic acid are especially suitable. These can be made readily by spraying dry silica gel, for example, with the desired amount of an aqueous solution of the chosen acid. Preferably a relatively dilute acid solution is used in order to facilitate uniform application. Sulfuric acid solutions of about 1 to about 10% concentration are advantageous. Usually about 0.01 to about 3 millimoles of sulfuric acid per gram of silica is used but larger or smaller amounts can be employed although there is generally no advantage in depositing more acid than corresponds to a monomolecular layer. About 3 millimoles of $H_2SO_4$ per gram of $SiO_3$ on silica gel of 800 square meter per gram surface area is estimated to correspond to a monomolecular layer.

As previously indicated a small amount of acid must also be added with the oxirane feed to the reaction. The preferred acids are non-volatile, inorganic, non-oxidizing acids such as sulfuric, phosphoric, silico tungstic and like acids. The most advantageous acids are those soluble in the reaction mixture. Preferably about 0.0005 to about 0.2 mole, more preferably about 0.02 to about 0.08 mole, of polyvalent acid are used per mole of epoxyaldehyde fed to the reaction. Sufficient acid to reduce the pH of the aqueous oxirane feed to not more than about 5 and more preferably to bring the pH to about 0.5 to about 3 is used but as previously indicated the amount of acid should be not more than about 0.2 equivalent of acid per mole of oxirane compound. In general it is most advantageous to bring the pH to about 1 to about 2 by adding about 0.02 to about 0.08 equivalent of acid per mole of oxirane compound.

At least one mole of water per mole of oxirane oxygen should be used in the reaction and more advantageously about 7 to about 50 moles of water are employed.

The reaction is conducted with the oxirane compound in the liquid phase. A temperature of about 50 to about 120° C. and more preferably between about 75 and about 100° C. is usually desirable for the reaction.

The process can be carried out in different ways. One method which is particularly suitable for batchwise operation comprises carrying out the reaction with the adsorptive solid contact material in the form of finely divided particles, preferably of about 50 to about 200 mesh. These particles are slurried in a liquid mixture containing the oxirane compound to be hydrated, water and added acid sufficient to bring the pH of the mixture to about 1 to about 2 in the absence of the solid contact material. During the course of the reaction the mixture will of course also include the polyhydroxy compound formed in the hydration. In a preferred modification of this method, the solid contact material is maintained suspended in the reaction mixture in a heated reaction zone for the period required for the reaction, usually about 1 to about 10 minutes, by suitable agitation of the mixture. After the hydration has been completed the adsorptive contact material is separated from the aqueous liquid products of the reaction by decantation and/or filtration or centrifugation and the resulting polyhydroxy compound is recovered in any suitable manner.

The reaction can be carried out continuously by maintaining an agitated body of liquid reaction mixture having adsorptive solid contact material suspended therein as above described, adding fresh oxirane compound and water together with the required small amount of inorganic acid to the mixture continuously and withdrawing continuously a stream of reacted mixture from which the polyhydroxy compound product is recovered. The adsorptive solid contact material recovered from the product can be recycled to the reaction to maintain the catalyst concentration in the mixture at the desired level.

A more advantageous method of continuous hydration of oxirane compounds according to the invention makes use of a fixed bed of adsorptive solid contact material of the type previously described. Through this bed, preferably composed of particles of about 5 to about 20 mesh size, is passed the aqueous mixture of oxirane compound to be hydrated together with added acid in the amounts previously indicated. Either up flow or down flow through the bed may be employed, the rate of flow being regulated to provide a time of contact sufficient for the desired hydration. The effluent is cooled, preferably neutralized, and the product recovered or employed for further reaction as required.

The process of the invention has outstanding value in the hydration of polar substituted oxirane compounds, especially alpha,beta-epoxy polar compounds, because this type of starting oxirane compound involves special difficulties due to the greater tendency of these compounds and their hydration products to undergo undesirable side reaction during hydration which are substantially avoided in the new process. An especially important type of starting compounds of this kind are the epoxyaldehydes, which are efficiently and rapidly converted by the method of the invention to polyhydroxyaldehydes. Polyhydroxyaldehydes are useful starting materials for the synthesis of a variety of products. Glyceraldehyde, for example, is advantageous for conversion to glycerol by hydrogenation and related polyols can be made similarly from higher homologues of glycerol-aldehyde. These polyhydroxyaldehydes have, however, not been readily available. An important special object of the present invention is the provision of a commercially practical method for producing polyhydroxyaldehydes from the corresponding epoxyaldehydes which can be produced by epoxidizing ethylenic aldehydes or by other methods. Conversion of the epoxyaldehydes to polyhydroxyaldehydes by hydration of the epoxy group according to the methods previously used in hydrating oxirane compounds is either so slow that large equipment must be provided in the plant, thus increasing the cost of the product, or the yields are low as a result of side reactions resulting from the agents used to speed up the hydration. The process of the present invention is designed to avoid both of these disadvantages and provides a method especially advantageous for the very rapid hydration of epoxyaldehydes to the corresponding polyhydroxyaldehydes in high yields and conversions.

The following non-limiting examples further illustrate the invention and show some of its advantages:

*Example I*

Glyceraldehyde was produced by hydrating glycidaldehyde in a packed column using a series of different adsorptive inorganic contact materials. In all cases the feed was a mixture comprising 25.2 moles of water per mole of glycidaldehyde to which sulfuric acid was added in amounts to bring the pH between 1 and 2 before the mixture was fed to the column. The results of operations

| Solid Catalyst | Volume of Solid Catalyst (cc.) | Glycidaldehyde Feed Rate (gram moles per hour) | Sulfuric Acid Added (moles per mole glycidaldehyde) | Temperature (° C.) | Residue Time (min.) | Glycidaldehyde Conversion (mole percent) | Glyceraldehyde Yield (mole percent on glycidaldehyde) |
|---|---|---|---|---|---|---|---|
| Celite VIII (pellets) | 295 | 6.1 | 0.023 | 100 | 3.9 | 97 | 91 |
|  | 295 | 5.4 | 0.033 | 100 | 3.7 | 96 | 97 |
|  | 310 | 7.6 | 0.036 | 100 | 2.7 | 96 | 100 |
| "Aerocrat" cracking catalyst (microspherical silica-alumina containing 14 to 15% $Al_2O_3$) | 691 | 3.2 | 0.061 | 85 | 12.0 | 97 | 98 |
|  | 691 | 5.7 | 0.063 | 96 | 7.5 | 95 | 100 |
| Houdry "565" cracking catalyst (silica-alumina containing 14 to 15% $Al_2O_3$) | 750 | 10.3 | 0.070 | 96 | 5.5 | 97 | 100 |
|  | 750 | 9.6 | 0.051 | 96 | 7.5 | 100 | 94 |
| Silica Gel (granules) | 691 | 5.5 | 0.160 | 96 | 8.8 | 100 | 99 |

Example II

The method of Example I repeated with silica gel as the catalyst gives essentially the same conversion and yield of glyceraldehyde when an equivalent amount of phosphoric acid is substituted for the sulfuric acid added with the feed to the column.

Example III

Epoxyisobutyraldehyde

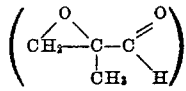

is hydrated with an essentially quantitative yield of alpha-methylglyceraldehyde by passing the epoxyisobutyraldehyde and water in a mole ratio of 1 to 20, at the rate of about 5 gram moles of aldehyde per hour through a column of silica-alumina cracking catalyst containing 5% of alumina, together with 0.02 mole of $H_2SO_4$ per mole of epoxyaldehyde fed and using a temperature of 90° C. and a contact time of about 5 minutes.

Example IV

Using the method of Example III equally good results are obtained when 2,3-epoxybutyraldehyde is hydrated to beta-methyl glyceraldehyde.

Specific epoxyaldehydes, other than those of the foregoing examples, which can be similarly hydrated include for example: the aliphatic alpha,beta-epoxyaldehydes; 2-methyl - 2,3 - epoxybutyraldehyde; 2,3 - dimethyl - 2,3-epoxybutyraldehyde; 2,3-epoxycaprylaldehyde, and 2,3-epoxycapricaldehyde, the epoxyaldehydes in which the epoxide group is further removed from the aldehyde group; 3,4 - epoxybutyraldehyde; 5,6 - epoxyoenanthaldehyde

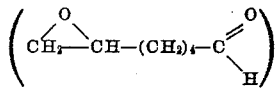

and 9,10-epoxystearylaldehyde; aromatic epoxyaldehydes such as 3-phenyl-2,3-epoxypropionaldehydes such as 3-phenyl-2,3-epoxypropionaldehyde, etc. The method gives particularly good results in the hydration of mono-epoxy, mono-aldehydes of 3 to 18 carbon atoms per molecule which are free of multiple bonds between carbon atoms in an aliphatic group and which consist only of carbon, hydrogen, and the epoxy and aldehyde oxygen atoms.

It will thus be seen that the process of the invention offers many advantages. It is applicable to the hydration of other oxirane compounds than those given by way of illustration and is not intended to be restricted by the foregoing examples nor by any theory proposed in explanation of the improved results which are obtained.

I claim as my invention:

1. In a process for hydrating an epoxyaldehyde selected from the group of mono-vic-epoxy monoaldehydes consisting of alkyl and monophenylalkyl aldehydes, said alkyl groups being saturated and said aldehydes having from 3 to 18 carbon atoms per molecule and consisting of only carbon, hydrogen and the epoxy and aldehyde oxygen atoms, the improvement which comprises adjusting the pH of a mixture comprising said monoaldehyde and water to bring the pH below about 5 and contacting the acid mixture in the liquid phase with a solid adsorbent inorganic contact material at an elevated temperature, thereby hydrating said monoaldehyde with the formation of a reaction mixture comprising the corresponding polyhydroxy aldehyde.

2. A process in accordance with claim 1 wherein the pH of the feed is adjusted to about 0.5 to about 3 by adding a polybasic non-oxidizing inorganic acid having an ionization constant for the first hydrogen atom of at least $10^{-3}$ in an amount not greater than about 0.4 equivalent per mole of epoxyaldehyde used.

3. A process in accordance with claim 2 wherein the epoxyaldehyde-containing feed is contacted with an acidic solid adsorbent material at a temperature below 30° C. and 120° C. for a period of not more than 30 minutes.

4. In a process for producing a dihydroxyaldehyde by hydrating the corresponding epoxyaldehyde said epoxyaldehyde being selected from the group of mono-vic-epoxy monoaldehydes consisting of alkyl and monophenylalkyl aldehydes, said alkyl groups being saturated, having three to eighteen carbon atoms per molecule and consisting of only carbon, hydrogen and the epoxy and aldehyde oxygen atoms, the improvement which comprises dissolving a strong inorganic acid in a mixture of said epoxyaldehyde and water in an amount sufficient to reduce the pH to a value not greater than 1 but in an amount which is not more than 0.2 equivalent of acid per mole of epoxyaldehyde used and contacting the resulting aqueous mixture with a solid adsorbent inorganic contact material at a temperature of about 50° C. to about 120° C.

5. A process in accordance with claim 4 wherein the solid adsorbent contact material is a silicious material having a surface area between about 500 and about 800 square meters per gram and an average pore diameter between about 20 and about 50 Angstrom units.

6. A process in accordance with claim 5 wherein the solid adsorbent contact material comprises silica gel and the epoxyaldehyde is an alpha,beta-epoxyaldehyde.

7. A process in accordance with claim 6 wherein alpha-methyl glyceraldehyde is produced by hydrating epoxyisobutyraldehyde.

8. In a process for producing glyceraldehyde by hydrating glycidaldehyde the improvement which comprises adding sulfuric acid to an aqueous solution of glycidaldehyde containing about 7 to about 80 moles of water per mole of glycidaldehyde, the amount of added acid being sufficient to reduce the pH of the mixture to a value not greater than about 3 but in an amount which is not greater than about 0.2 equivalents of acid per mole of glycidaldehyde, and contacting the acidified mixture at about 50° C. to about 120° C. with a solid adsorbent inorganic contact material for between about 1 to about 30 minutes.

9. A process in accordance with claim 8 wherein said acidified mixture is passed through a fixed bed of solid silicious contact material of about 5 to about 100 mesh size.

10. A process in accordance with claim 9 wherein the solid contact material is a silica-alumina catalyst containing not more than 15% alumina.

11. A process in accordance with claim 9 wherein the solid contact material is silica gel having sulfuric acid deposited on the surface thereof.

References Cited in the file of this patent

Reed et al.: Ind. and Eng. Chem., vol. 48 No. 2, February 1956, pgs. 205–208.

Pritchard et al.: Jour. Amer. Chem. Soc., vol. 78 (1956), 2667–70.